(12) United States Patent
Yasutomi (10) Patent No.: US 11,100,678 B2
(45) Date of Patent: *Aug. 24, 2021

(54) LEARNING DEVICE, LEARNING METHOD, AND RECORDING MEDIUM

(71) Applicant: FUJITSU LIMITED, Kawasaki (JP)

(72) Inventor: Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,667

(22) Filed: Dec. 19, 2019

(65) Prior Publication Data

US 2020/0226796 A1 Jul. 16, 2020

(30) Foreign Application Priority Data

Jan. 11, 2019 (JP) .............................. JP2019-003830

(51) Int. Cl.
  *G06K 9/00* (2006.01)
  *G06T 9/00* (2006.01)
  *G06T 7/00* (2017.01)
  *G06T 11/00* (2006.01)

(52) U.S. Cl.
  CPC ............ *G06T 9/002* (2013.01); *G06T 7/0002* (2013.01); *G06T 11/008* (2013.01); *G06T 2207/10132* (2013.01); *G06T 2207/20081* (2013.01); *G06T 2207/20224* (2013.01); *G06T 2207/30168* (2013.01)

(58) Field of Classification Search
  CPC ..... G06T 9/002; G06T 7/0002; G06T 11/008; G06T 2207/10132; G06T 2207/20081; G06T 2207/20224; G06T 2207/30168

USPC ......................................................... 382/157
See application file for complete search history.

(56) References Cited

U.S. PATENT DOCUMENTS

| | | | |
|---|---|---|---|
| 9,965,901 B2 | 5/2018 | Zhang et al. | |
| 10,387,765 B2 * | 8/2019 | Mailhe | G06N 3/084 |
| 10,430,688 B2 * | 10/2019 | Rao | A61B 8/5269 |
| 10,698,063 B2 * | 6/2020 | Braun | G06T 5/003 |
| 10,702,242 B2 * | 7/2020 | de Jonge | A61B 8/46 |

(Continued)

OTHER PUBLICATIONS

Adiga, Sukesh V. et al., *Shared Encoder based Denoising of Optical Coherence Tomography Images*, 11th Indian Conference on Computer Vision, Graphics and Image Processing (ICVGIP-2018), Dec. 2018, XP055688876 (9 pp.).

(Continued)

*Primary Examiner* — Jonathan S Lee
(74) *Attorney, Agent, or Firm* — Staas & Halsey LLP (57) ABSTRACT

A non-transitory computer-readable recording medium stores therein a learning program that causes a computer to execute a process including: inputting an output from an encoder to which an input image is input to a first decoder and a second decoder; and executing learning of the encoder, the first decoder and the second decoder, based on a reconstruction error between the input image and an output image obtained by using a combining function for synthesizing a first image that is an output from the first decoder and a second image that is an output from the second decoder, based on a first likelihood function for the first image relating to shades in ultrasound images, and based on a second likelihood function for the second image relating to subjects in ultrasound images.

12 Claims, 8 Drawing Sheets

(56) References Cited

U.S. PATENT DOCUMENTS 10,852,379 B2 * 12/2020 Chen .................. G01R 33/4818
2020/0226494 A1 * 7/2020 Yasutomi .............. G06T 7/0012

OTHER PUBLICATIONS

Gibson, Eli et al., *NiftyNet: a deep-learning platform for medical imaging*, arxiv.org, Cornell University Library, 201 Olin Library, Cornell University, Ithaca, NY 14853, Sep. 11, 2017 (Sep. 11, 2017), XP081294865 (26 pp.).

Meng, Qingjie et al. *Automatic Shadow Detection in 2D Ultrasound Images*, International Conference on Financial Cryptography and Data Security; [Lecture Notes in Computer Science], Springer, Berlin, Heidelberg, Sep. 15, 2018 (Sep. 15, 2018) pp. 66-75, XP047485755 (10 pp.).

Extended European Search Report, dated May 8, 2020, in European Application No. 19217485.2 (9 pp.).

Pierre Hellier et al., "An automatic geometrical and statistical method to detect acoustic shadows in intraoperative ultrasound brain images", Elsevier, Medical Image Analysis, vol. 14, Nov. 17, 2009, pp. 195-204.

Qingjie, Meng et al., "Automatic Shadow Detection in 2D Ultrasound", $1^{st}$ Conference on Medical Imaging with Deep Learning, 2018, p. 1-3.**

Cerrolaza Juan J. et al.; "Deep learning with ultrasound physics for fetal skull segmentation"; 2018 IEEE 15th International Symposium on Biomedical Imaging (ISBI 2018), IEEE, Apr. 4, 2018, pp. 564-567, XP033348264, DOI: 10.1109/ISBI.2018.8363639 [retrieved on May 23, 2018]; (4 pages).

Li Yan et al.; "Automatic fetal body and amniotic fluid segmentation from fetal ultrasound images by encoder-decoder network with inner layers"; 2017 39th Annual International Conference of the IEEE Engineering in Medicine and Biology Society (EMBC), IEEE, Jul. 11, 2017, pp. 1485-1488, XP033152327, DOI: 10.1109/EMBC.2017.8037116 [retrieved on Sep. 13, 2017]; (4 pages).

Extended European Search Report dated Mar. 18, 2020 in European Patent Application No. 19215565.3 (9 pages).

U.S. Appl. No. 16/717,563, filed Dec. 17, 2019, Suguru Yasutomi et al., Fujitsu Limited.

\* cited by examiner

LEARNING DEVICE, LEARNING METHOD, AND RECORDING MEDIUM

CROSS-REFERENCE TO RELATED APPLICATION

This application is based upon and claims the benefit of priority of the prior Japanese Patent Application No. 2019-003830, filed on Jan. 11, 2019, the entire contents of which are incorporated herein by reference.

FIELD

The embodiments discussed herein are related to a learning technique.

BACKGROUND

For the purpose of examination, non-destructive inspection of subject, etc., in medicine, object detection and condition determination have been carried out by performing image processing using ultrasound images. For such image processing on ultrasound images, a model, such as deep neural net (DNN) having learned by machine learning, is used.

A shadow may be in an ultrasound image because of a difference in ultrasound transmission velocity between substances and reflection of ultrasound. In such a case, accuracy of image processing lowers. To deal with this, a technique to perform learning of a DNN using an image tagged with a label indicating whether there is a shade has been proposed.

For example, a related technique is disclosed in Meng, Qingjie, et al. "Automatic Shadow Detection in 2D Ultrasound." (2018).

SUMMARY

According to an aspect of the embodiments, a non-transitory computer-readable recording medium stores therein a learning program that causes a computer to execute a process including: inputting an output from an encoder to which an input image is input to a first decoder and a second decoder; and executing learning of the encoder, the first decoder and the second decoder, based on a reconstruction error between the input image and an output image obtained by using a combining function for synthesizing a first image that is an output from the first decoder and a second image that is an output from the second decoder, based on a first likelihood function for the first image relating to shades in ultrasound images, and based on a second likelihood function for the second image relating to subjects in ultrasound images.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The above-described technique however has a problem in that it is difficult to properly determine whether a shade is in an ultrasound image in some cases. For example, so-called supervised learning is performed in the above-described technique and, manually, training data is tagged with labels, that is, it is determined whether a shade is in the image. For example, a light shade may be contained in an image that is determined as one without shadow. Thus, the above-described technique has a difficulty in unifying determination standards and, as a result, the quality of training data would not possibly be uniform and appropriate learning would not possibly be carried out.

Preferred embodiments will be explained with reference to accompanying drawings. The embodiments do not limit the invention. The following embodiments may be combined as appropriate as long as no inconsistency is caused.

A first embodiment will be described. A model in the first embodiment is based on an autoencoder using a DNN and includes one encoder and two decoders: a shade decoder and a subject decoder. The model further includes a combining function that synthesizes outputs from the two decoders. The shade decoder is an example of the first decoder. The subject decoder is an example of the second decoder.

Figure 1:
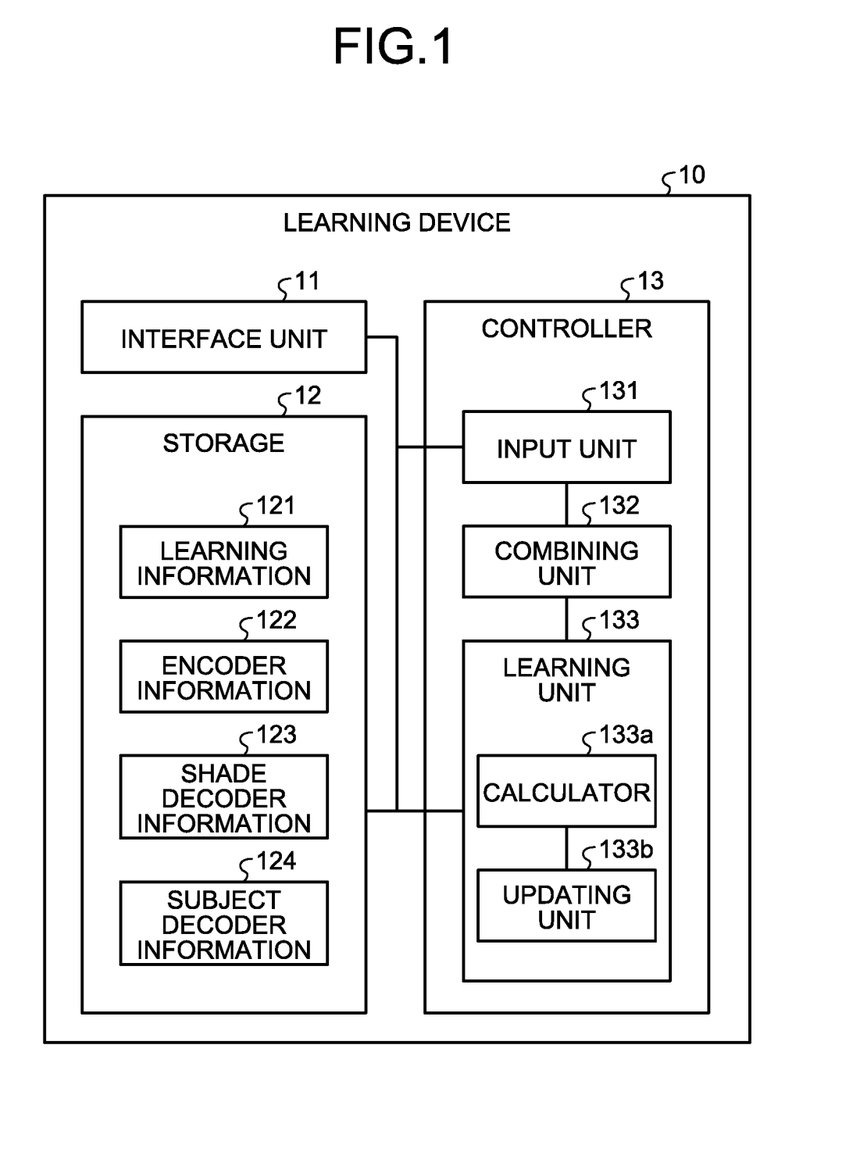
FIG. 1 is a diagram illustrating an exemplary functional configuration of a learning device according to an embodiment.

Using FIG. 1, the functional configuration of the learning device according to the embodiment will be described. FIG. 1 is a diagram illustrating an exemplary functional configuration of the learning device according to the embodiment. As illustrated in FIG. 1, a learning device 10 includes an interface unit 11, a storage 12 and a controller 13.

The interface unit 11 is an interface for input and output of data between the interface unit 11 and input and output devices and for communicating data with other devices. For example, the interface unit 11 performs input and output of data between the interface unit 11 and an input device, such as a keyboard or a mouse, an output device, such as a display or a speaker, or an external storage device, such as a USB memory. For example, the interface unit 11 is a network interface card (NIC) and communicates data via the Internet.

The storage 12 is an exemplary storage device that stores data, a program that is executed by the controller 13, etc., and is, for example, a hard disk or a memory. The storage 12 stores learning information 121, encoder information 122, shade decoder information 123 and subject decoder information 124.

The learning information 121 is information, such as a hyper parameter, used when the model learns. For example, the learning information 121 contains a learning rate, a batch size and a distribution parameter of likelihood function.

The encoder information 122 is a parameter for the encoder. The shade decoder information 123 is a parameter for the shade decoder. The subject decoder information 124 is a parameter for the subject decoder. The parameters learnable by the encoder and the decoders will be referred to as model parameters. For example, a model parameter is a weight and a bias for the DNN. The encoder information 122, the shade decoder information 123 and the subject decoder information 124 are updated when the model learns.

The controller 13 is enabled by, for example, a central processing unit (CPU), a micro processing unit (MPU) or a graphics processing unit (GPU) by executing a program that is stored in an internal storage device using a RAM as a work area. Furthermore, the controller 13 may be enabled by, for example, an integrated circuit, such as an application specific integrated circuit (ASIC) or a field programmable gate array (GPGA). The controller 13 includes an input unit 131, a combining unit 132, and a learning unit 133. The learning unit 133 includes a calculator 133a and an updating unit 133b.

The input unit 131 inputs an output from the encoder to which an input image is input to the shade decoder and the subject decoder. Using the combining function, the combining unit 132 synthesizes a shade image that is an output from the shade decoder and a subject image that is an output from the subject decoder. The shade image is an example of the first image. The subject image is an example of the second image.

The learning unit 133 executes learning for the encoder, the shade decoder and the subject decoder, based on a reconstruction error, a first likelihood function and a second likelihood function. The reconstruction error is an error between the input image and an output image obtained using the combining function to synthesize the shade image that is an output of the shade decoder and the subject image that is an output of the subject decoder. The first likelihood function is a likelihood function for the shade image relating to shades in ultrasound images. The second likelihood function is a likelihood function for the subject image relating to subjects in ultrasound images.

The calculator 133a calculates a loss function from the likelihood based on the first likelihood function and the likelihood based on the second likelihood function. The updating unit 133b updates the model parameters of the encoder, the shade decoder, and the subject decoder such that the loss function reduces. Specifically, the updating unit 133b updates the encoder information 122, the shade decoder information 123, and the subject decoder information 124.

Figure 2:
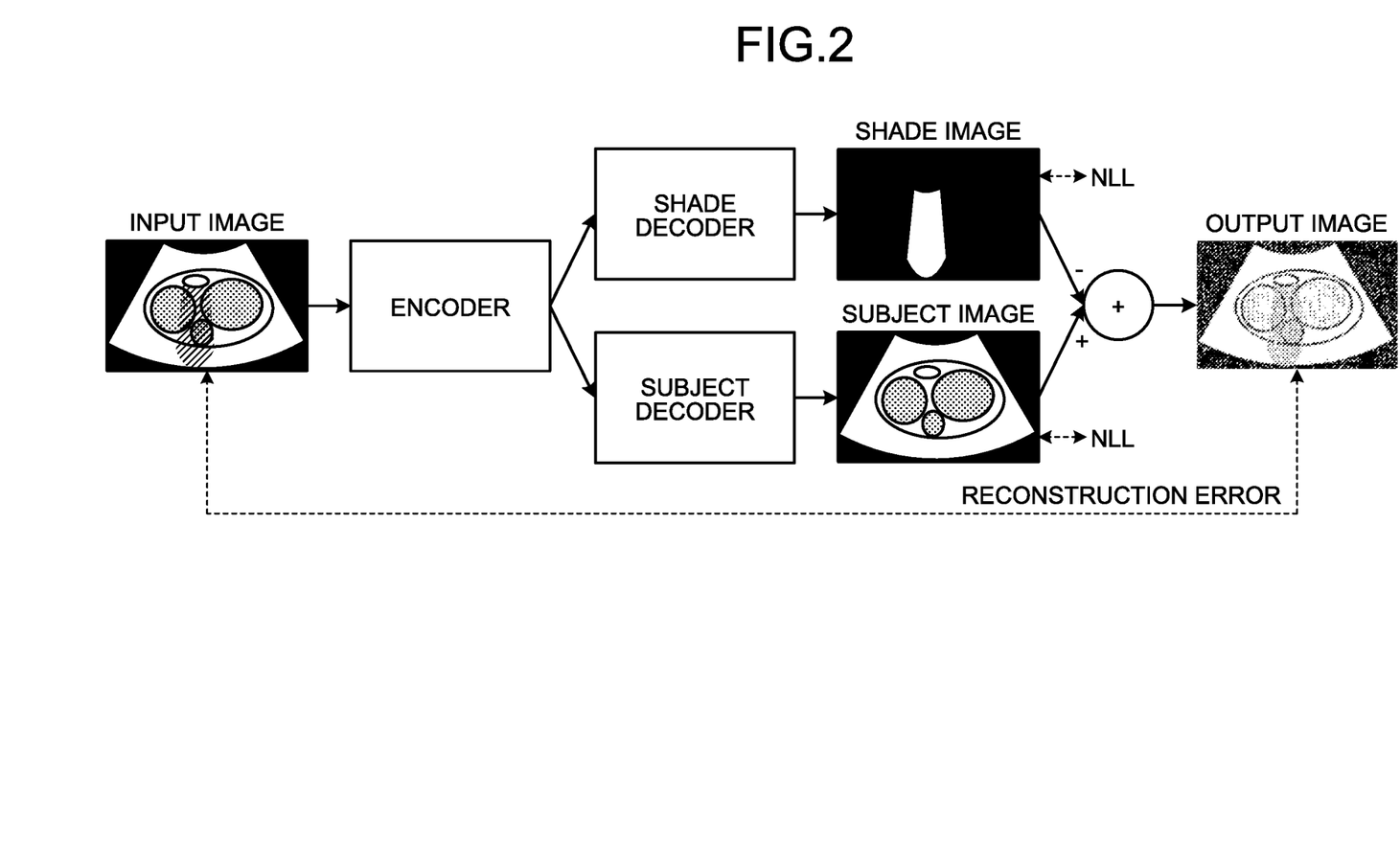
FIG. 2 is a diagram for explaining a learning process.

Using FIG. 2, the learning process performed by the learning device 10 will be described. FIG. 2 is a diagram for explaining the learning process. As illustrated in FIG. 2, the input unit 131 inputs an input image to the encoder.

The input image in FIG. 2 is an internal ultrasound image of a human body that is acquired using a medical probe. In the following description, an image obtained by visualizing a signal obtained from the probe is referred to as an ultrasound image. In an ultrasound image, an area with a subject, such as an internal organ that reflects ultrasound, is displayed brightly. On the other hand, a shade in an ultrasound image is displayed darkly.

For example, the velocity of transmission of ultrasound through a human body is approximately equal to the velocity of transmission of ultrasound in water. When an internal image of a human body is captured, air in an imaged area may hinder ultrasound from being transmitted and accordingly cause a shade in the ultrasound image. The input image in FIG. 2 is an ultrasound image captured by applying ultrasound to a subject from the upper side in FIG. 2. The slashed part of the input image represents a shade.

The input unit 131 inputs the output from the encoder to which the input image is input to the shade decoder and the subject decoder. In other words, when the encoder serves as a neural network including a given number of nodes as the first layer and nodes less than those of the first layer as the last layer, the last layer is connected to the first layers of the respective decoders also serving as neural networks.

The shade decoder and the subject decoder output images. Equalizing the number of nodes of the last layer of each of the decoders to the number of nodes of the first layer of the encoder enables each of the decoders to output an image in the same size as that of the input image.

As illustrated in FIG. 2, using the combining function to add the subject image and subtract the shade image, the combining unit 132 synthesizes the images to generate the output image. The combining unit 132 performs addition and subtraction of the pixel values of corresponding pixels. A pixel value is a value representing a luminance and, for each pixel, a pixel value is represented by a numerical value, for example, within a range from 0 to 255 (8-bit).

For example, when the pixel value of a pixel of coordinates (i,j) in the shade image is $p_{ij}$ and the pixel value of a pixel of coordinates (i,j) in the subject image is $q_{ij}$, the combining unit 132 is able to calculate a pixel value $r_{ij}$ of a pixel of coordinates (i,j) in the output image by $r_{ij}=q_{ij}-p_{ij}$.

While a shade is displayed darkly in an ultrasound image, the area of the shade in the shade image that is output from the shade decoder is displayed brightly. In other words, the pixel values of the shade area in the shade image are larger than those of other areas. This is because the combining unit 132 inverts the codes of the pixel values of the shade image. In other words, in learning, the model parameter of the shade decoder is updated to meet the inversion of codes of pixel values of the shade image performed by the combining unit 132.

The calculator 133a calculates a reconstruction error between the input image and the output image that is synthesized by the combining unit 132. The calculator 133a is able to calculate a reconstruction error using the same method as that of a known autoencoder.

The calculator 133a calculates a negative log likelihood (NLL) as likelihood of the shade image and the subject image. The calculator 133a uses, as the likelihood functions, functions in which vales corresponding to the pixel values of the image are variables and a maximum value is taken for a variable corresponding to a given pixel value that is none of the maximum pixel value and the minimum pixel value. This is for inhibiting any one of the shade image and the subject image from getting close to an image whose all the pixels have the maximum pixel value, that is, an all-white image or an image whose all the pixels have the minimum pixel value, that is, an all-black image.

For example, configuring the subject decoder to output the same image as the input image when the shade decoder outputs an all-black image reduces the reconstruction error; however, it becomes difficult to obtain the shade image.

Specifically, the calculator 133a uses likelihood functions based on probability density functions of beta distributions for which parameters are set such that the maximum value is taken when a random variable corresponding to a pixel value of an image is a given value larger than 0 and smaller than 1. The probability density function of beta distributions is represented by Equation (1). B(•) in Equation (1) is a beta function. Furthermore, α and β are parameters that determine the distribution shape of the beta distribution.

$$p(x \mid \alpha, \beta) = \frac{x^{\alpha-1}(1-x)^{\beta-1}}{B(\alpha, \beta)} \qquad (1)$$

Figure 3:
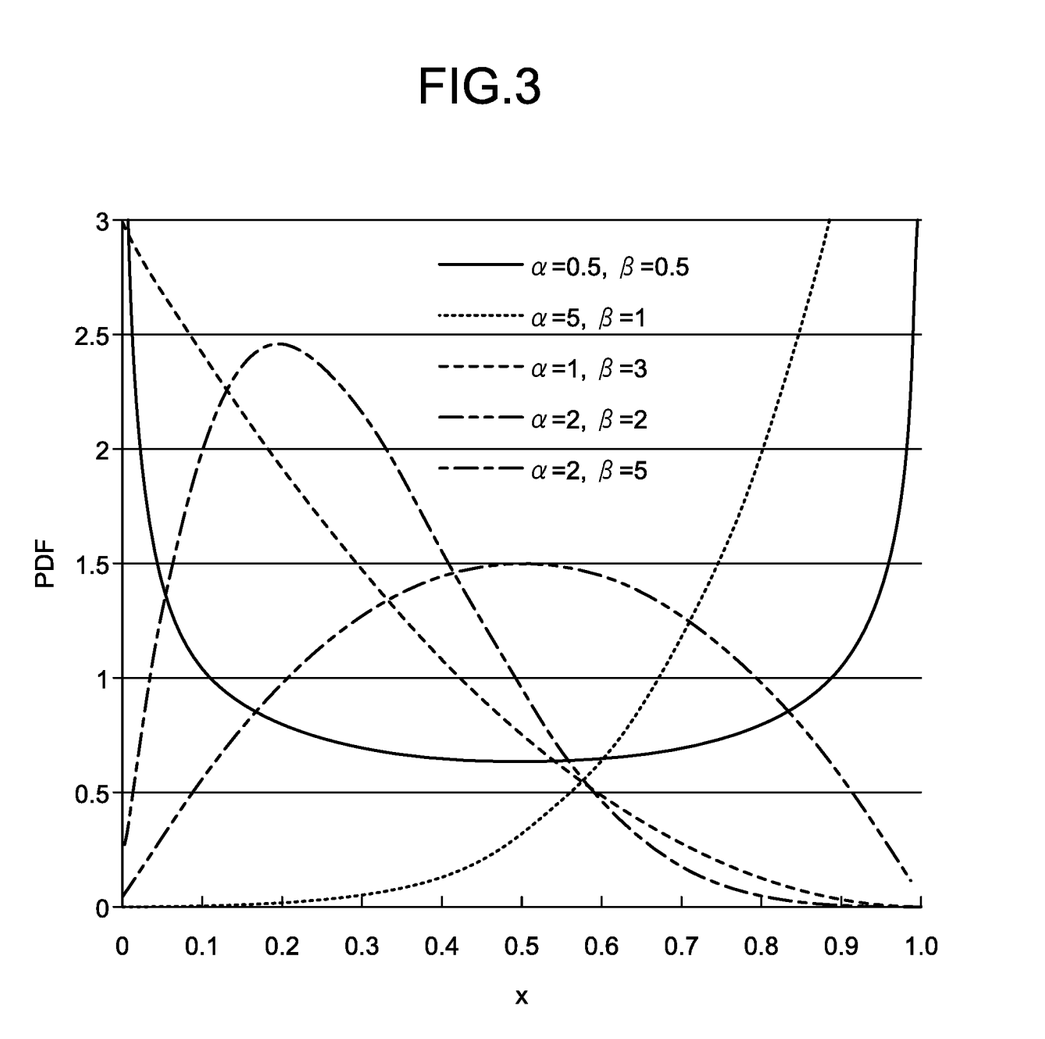
FIG. 3 is a diagram for explaining beta distributions.

Using FIG. 3, the shapes of beta distributions corresponding to α and β will be described. FIG. 3 is a diagram for explaining beta distributions. As illustrated in FIG. 3, for example, when α=0.5 and β=0.5, the probability density function (PDF) takes the maximum value when a random variable x is 0 or 1. For example, when α=2 and β=5, the PDF takes the maximum value when the random variable x is approximately 0.2.

Among combinations of α and β in FIG. 3, "α=2 and β=2" and "α=2 and β=5" meet the condition "the maximum value is taken when the random variable corresponding to a pixel value of the image is a given value larger than 0 and smaller than 1." For this reason, the calculator 133a is able to use, as the likelihood functions, for example, the probability density function of the beta distribution in which α=2 and β=2 are set and, for example, the probability density function of the beta distribution in which α=2 and β=5 are set. Effective setting values of α and β are not limited to those described herein, and any setting values that meet the condition may be used.

Even when the pixel values of the images that are output from the respective decoders are represented within the range from 0 to 255, the calculator 133a normalizes the pixel values by multiplying the pixel value by 1/255, thereby enabling the normalized pixel values to serve as random variables from 0 to 1.

Specifically, the calculator 133a calculates a NLL of the image that is output from each of the decoders as represented in Equation (2), where p(•|•) is the probability density function of beta distributions of Equation (1), values that meet the condition as described above are set for α and β, m is an index representing each pixel of the image, and $x_m$ is a pixel value obtained by normalizing a pixel m.

$$NLL = -\log \prod_m p(x_m \mid \alpha, \beta) = -\sum_m \log p(x_m \mid \alpha, \beta) \qquad (2)$$

The calculator 133a calculates, as the loss function, a linear sum of the NLL of the shade image, the NLL of the subject image, and the configuration error between the output image and the input image. For example, the calculator 133a calculates the loss function by $W_1$×(configuration difference)+$W_2$×(NLL of the shade image)+$W_3$×(NLL of the subject image), where $W_1$, $W_2$ and $W_3$ are weights that are set in advance and they may be contained as hyper parameters in the learning information 121. Furthermore, $W_1$, $W_2$ and $W_3$ may be set such that $W_1$, $W_2$ and $W_3$ are all positive and meet $W+W_2+W_3=1$.

The updating unit 133b updates the model parameters of the encoder, the shade decoder, and the subject decoder such that the loss function reduces. For example, the updating unit 133b updates the model parameters by back propagation.

Figure 4:
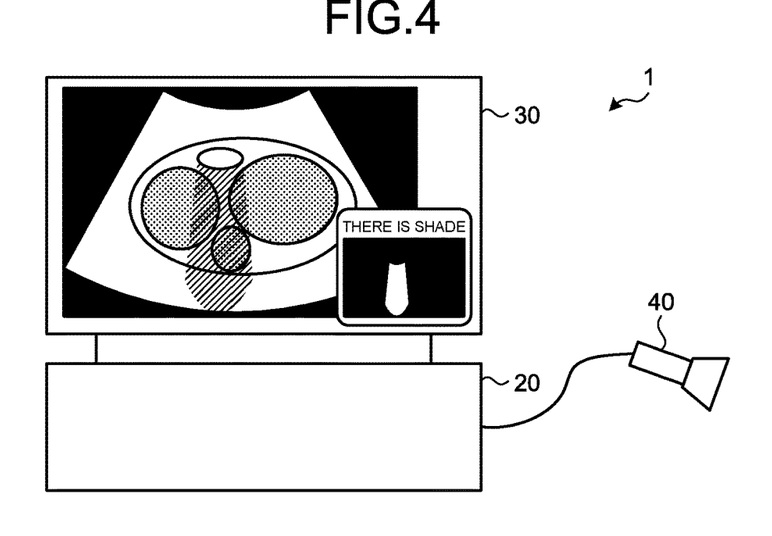
FIG. 4 is a diagram illustrating an exemplary image processing system according to the embodiment.

The image processing system enables image processing using the encoder and the shade decoder having learned in the learning device 10. Using FIG. 4, the image processing system will be described. FIG. 4 is a diagram illustrating an exemplary image processing system according to the embodiment.

As illustrated in FIG. 4, the image processing system 1 includes a recognition device 20, a display device 30, and a probe 40. The recognition device 20 generates an ultrasound image and performs given post-processing based on signals that are received from the probe 40 and outputs the generated ultrasound image and the result of post-processing to the display device 30. The probe 40 generates ultrasound and further receives the ultrasound that is reflected. The probe 40 may generate an ultrasound image and transmit the generated ultrasound image to the recognition device 20.

The image processing system 1 is used by a doctor to make a diagnosis. For example, the probe 40 is pushed by a doctor against the body surface of a patient and transmits the received ultrasound as a signal to the recognition device 20. The recognition device 20 causes the display device 30 to display an ultrasound image that is generated based on the signal received from the probe 40. Furthermore, the recognition device 20 determines whether a shade is in the ultrasound image and performs the post-processing according to whether there is a shade.

The recognition device 20 is able to perform, as the post-processing, a process of notifying the doctor of the fact that a shade is in the ultrasound image via the display device 30 or another output device. As illustrated in FIG. 14, the recognition device 20 may cause the display device 30 to display the generated shade image. Furthermore, the recognition device 20 may synthesize the ultrasound image and the shade image to generate an image obtained by excluding the shade from the ultrasound image.

The recognition device 20 performs, as the post-processing, the process of determining whether given image processing is applicable to the ultrasound image based on whether a shade is in the ultrasound image and, if possible, perform image recognition. The image recognition contains object detection or condition determination.

Figure 5:
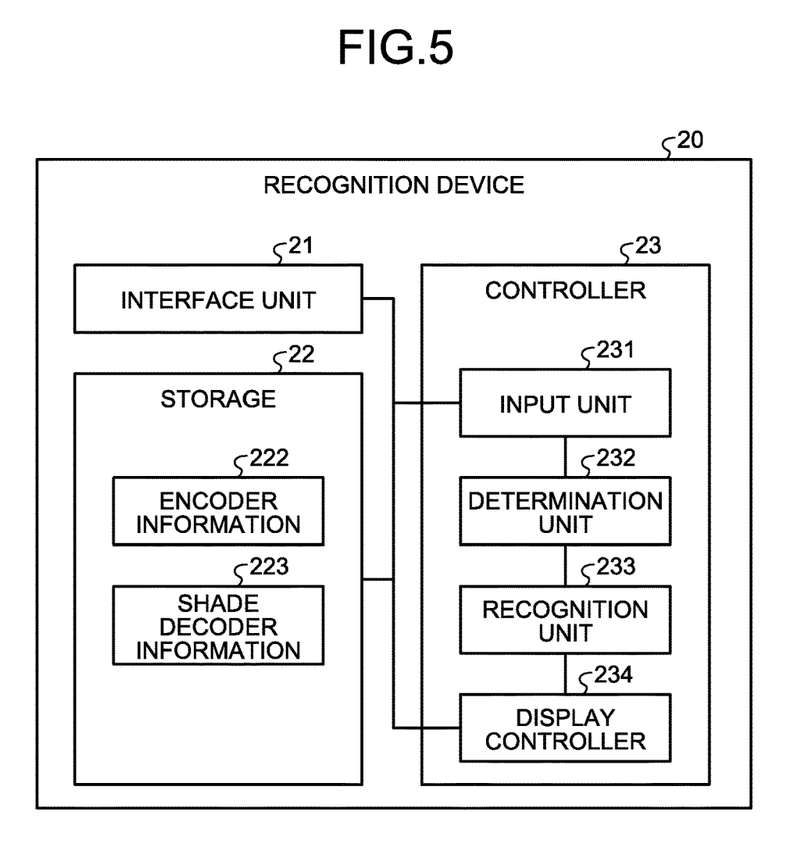
FIG. 5 is a diagram illustrating an exemplary functional configuration of a recognition device according to the embodiment.

Using FIG. 5, a functional configuration of the recognition device according to the embodiment will be described. FIG. 5 is a diagram illustrating an exemplary functional configuration of the recognition device according to the embodiment. As illustrated in FIG. 5, the recognition device 20 includes an interface unit 21, a storage 22 and a controller 23.

The interface unit 21 is an interface for input and output of data between the interface unit 21 and an input-output device and for communicating data with other devices. For example, the interface unit 21 performs input and output of data between the display device 30 and the probe 40.

The storage 22 is an exemplary storage device that stores data and a program that is executed by the controller 23 and is, for example, a hard disk or a memory. The storage 22 stores encoder information 222 and shade decoder information 223.

The encoder information 222 is the same data as the encoder information 122 after learning in the learning device 10. The shade decoder information 223 is the same data as the shade decoder information 123 after learning in the learning device 10. For this reason, using the encoder information 222 and the shade decoder information 223, the recognition device 20 is able to construct the encoder and the shade decoder having learned.

The controller 23 is enabled by, for example, the CPU, the MPU, or the GPU by executing the program that is stored in the internal storage device using the RAM as a work area. The controller 23 may be enabled using an integrated circuit, such as an ASIC or a FPGA. The controller 23 includes an input unit 231, a determination unit 232, a recognition unit 233, and a display controller 234.

The input unit 231 performs the same process as that performed by the input unit 131 of the learning device 10. In other words, the input unit 231 inputs the output from the encoder to which the input image is input to the shade decoder. The determination unit 232 further determines whether image recognition is applicable to the input image based on the shade image. The recognition unit 233 executes image recognition when it is determined that image recognition is applicable. The display controller 234 causes the display device 30 to display the ultrasound image. The display controller 234 may cause the display device 30 to display results of the determination process performed by the determination unit 232 and the image recognition performed by the recognition unit 233.

Figure 6:
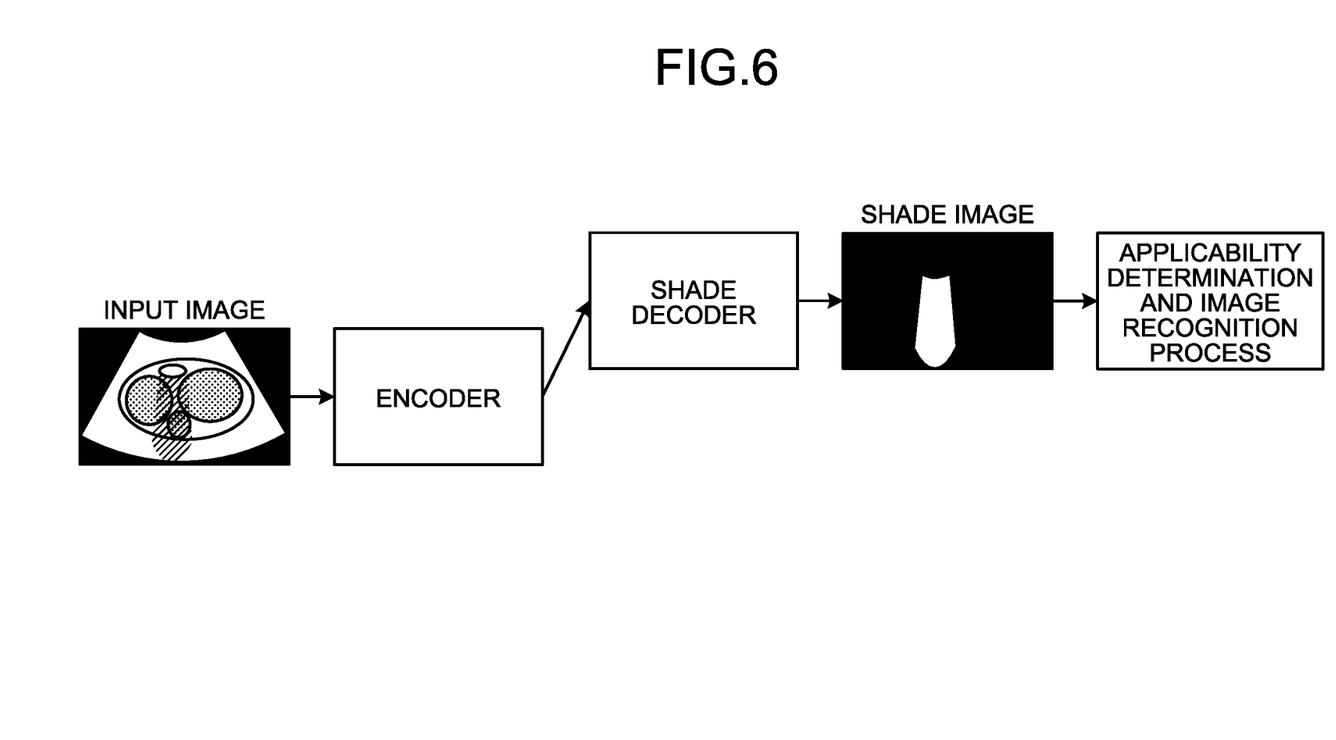
FIG. 6 is a diagram for explaining a recognition process.

Using FIG. 6, the recognition process performed by the recognition device 20 will be described. FIG. 6 is a diagram for explaining the recognition process. As illustrated in FIG. 6, the input unit 231 inputs the input image to the encoder. The input image in FIG. 6 is an ultrasound image that is obtained using the probe 40.

The input unit 231 inputs an output from the encoder to which the input image is input to the shade decoder. The recognition device 20 then performs image recognition applicability determination and an image recognition process based on the shade image that is output by the shade decoder. For example, the determination unit 232 determines that there is a shade when the sum of pixel values of respective pixels of the shade image is at or above a threshold.

Figure 7:
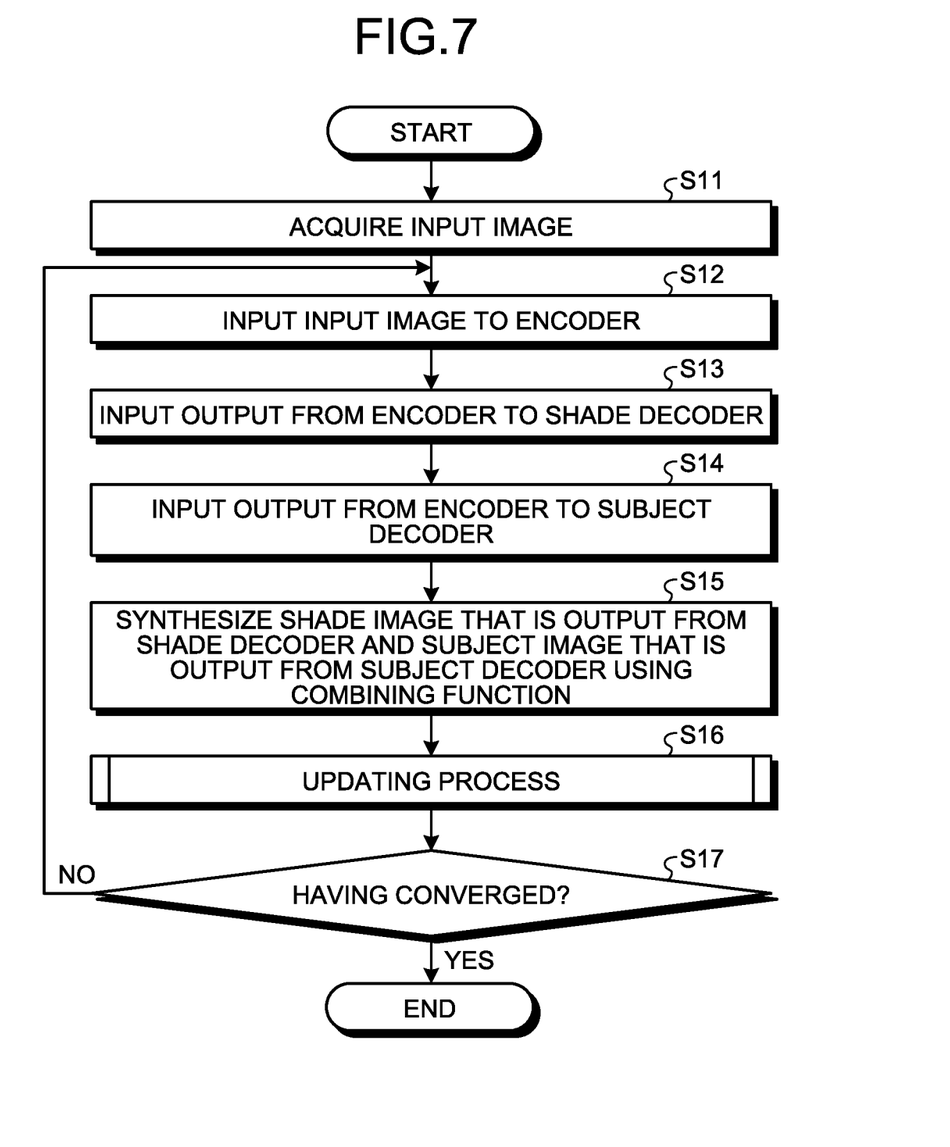
FIG. 7 is a flowchart illustrating a flow of a learning process.

Using FIG. 7, a flow of the learning process performed by the learning device 10 will be described. FIG. 7 is a flowchart illustrating the flow of the learning process. As illustrated in FIG. 7, first of all, the learning device 10 acquires an input image (step S11) and inputs the acquired input image to the encoder (step S12). The learning device 10 then inputs an output from the encoder to the shade decoder (step S13) and inputs the output from the encoder to the subject decoder (step S14).

The learning device 10 synthesizes a shade image that is output from the shade decoder and a subject image that is output from the subject decoder using the combining function (step S15). In the synthesizing, the learning device 10 adds the subject image and subtracts the shade image. The learning device 10 performs a process of updating each of the model parameters (step S16) and determines whether the updating process has converged (step S17).

When it is determined that the updating process has converged (YES at step S17), the learning device 10 determines ends the learning process. On the other hand, when it is determined that the updating process has not converged (YES at step S17), the learning device 10 returns to step S12 and repeats the process. For example, when the updating process is performed for a given number of times that is set previously and when the amount of update of the model parameters is equal to or smaller than a threshold, the learning device 10 determines that the updating process has converged.

Figure 8:
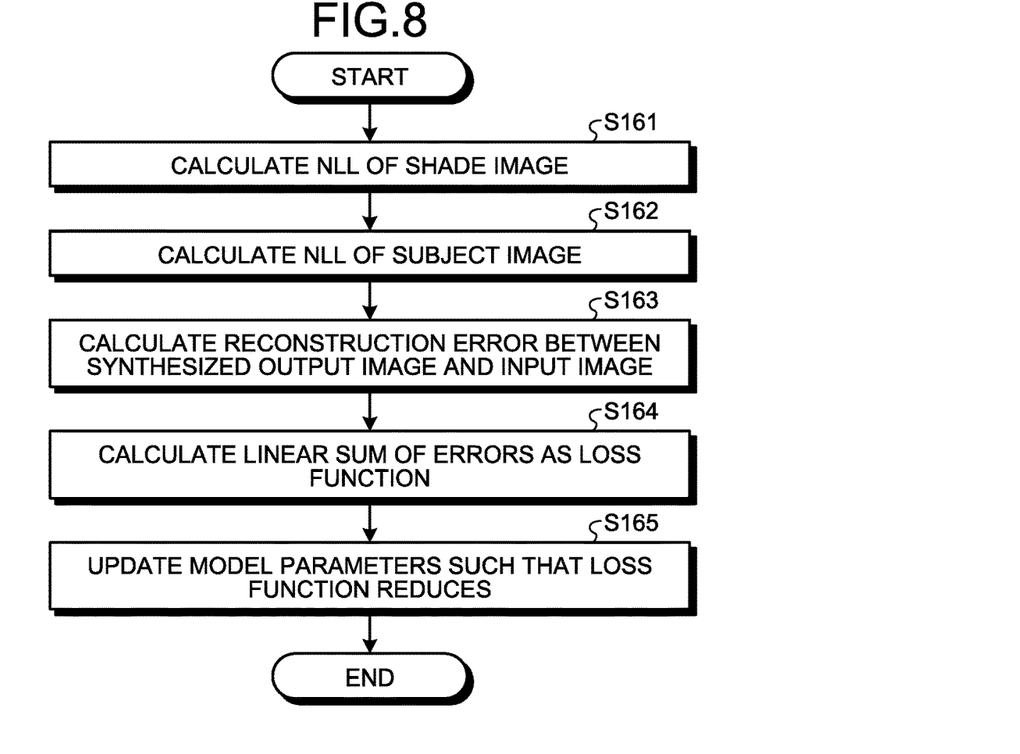
FIG. 8 is a flowchart illustrating a flow of an updating process.

Using FIG. 8, the flow of the updating process at step S16 will be described. FIG. 8 is a flowchart illustrating the flow of the updating process. As illustrated in FIG. 8, first of all, the learning device 10 calculates an NLL of the shade image (step S161) and an NLL of the subject image (step S162).

The learning device 10 then calculates a reconstruction error between the synthesized output image and the input image (step S163).

The learning device 10 further calculates a linear sum of the errors (the NLLs and the reconstruction error) as a loss function (step S164). The learning device 10 updates the model parameters such that the loss function reduces (step S165).

Figure 9:
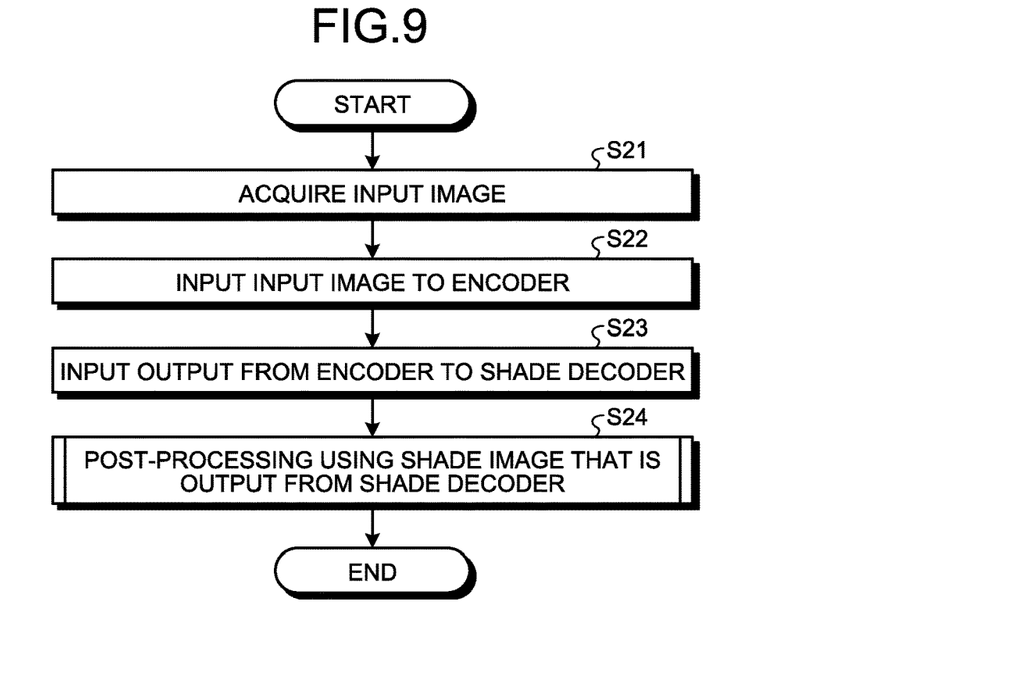
FIG. 9 is a flowchart illustrating a flow of the recognition process.

Using FIG. 9, a flow of the recognition process performed by the recognition device 20 will be described. FIG. 9 is a flowchart illustrating the flow of the recognition process. As illustrated in FIG. 9, first of all, the recognition device 20 acquires an input image (step S21) and inputs the acquired input image to the encoder (step S22). The recognition device 20 inputs an output from the encoder to the shade decoder (step S23). The recognition device 20 then executes the post-processing using a shade image that is output from the shade decoder (step S24).

Figure 10:
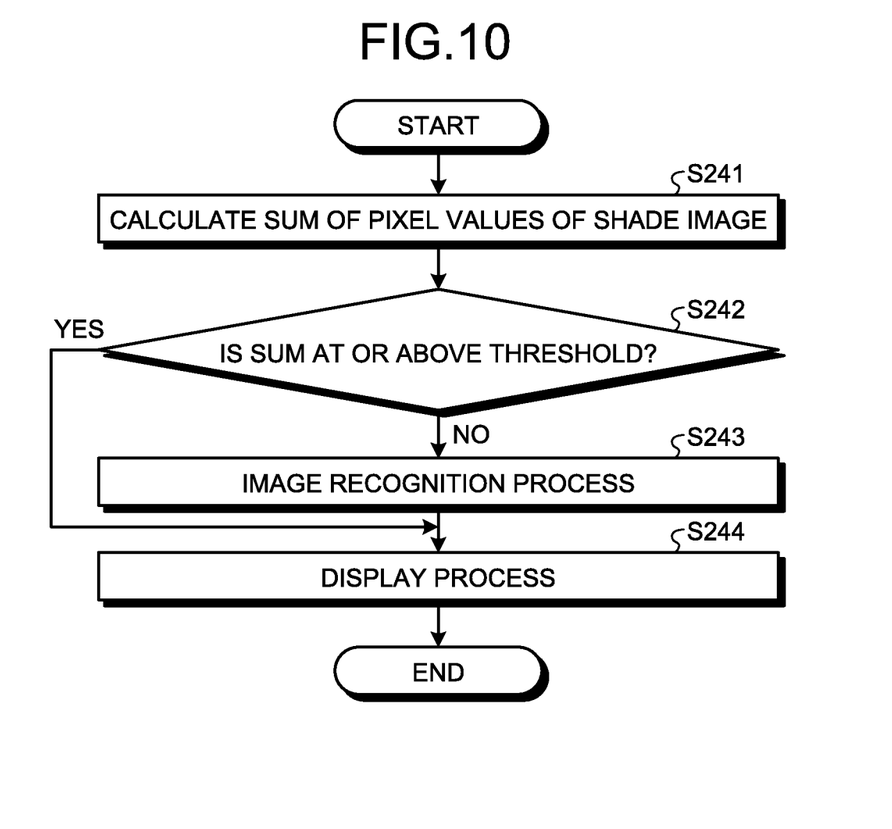
FIG. 10 is a flowchart illustrating a flow of post-processing.

Using FIG. 10, a flow of the post-processing at step S24 will be described. FIG. 10 is a flowchart illustrating the flow of the post-processing. As illustrated in FIG. 10, first of all, the recognition device 20 calculates a sum of the pixel values of the shade image (step S241) and determines whether the sum is at or above the threshold (step S242).

When the sum is not at or above the threshold (NO at step S242), the recognition device 20 determines that there is no shade and executes the image recognition process (step S243). On the other hand, when the sum is at or above the threshold (YES at step S242), the recognition device 20 determines that there is a shade and does not execute the image recognition process).

The recognition device 20 then causes the display device 30 to display the input image (step S244). When it is determined that there is no shade and the image recognition process is performed, the recognition device 20 causes the display device 30 to display the result of the image recognition process. On the other hand, when it is determined that there is a shade and the image recognition process is performed, the recognition device 20 causes the display device 30 to display a message notifying that there is a shade and the shade image.

As described above, the learning device 10 inputs an output from the encoder to which an input image is input to the first decoder and the second decoder. The learning device 10 executes learning of the encoder, the shade decoder and the subject decoder based on a reconstruction error, the first likelihood function and the second likelihood function. The reconstruction error is an error between the input image and an output image obtained using the combining function to synthesize a shade image that is an output from the shade decoder and a subject image that is an output from the subject decider. The first likelihood function is a likelihood function for the shade image relating to shades in ultrasound images. The second likelihood function is a likelihood function for the subject image relating to subjects in ultrasound images. As described above, even when the input image is not tagged with a label, the learning device 10 is able to perform learning of the model to output a shade image by unsupervised learning. For this reason, according to the embodiment, it is possible to appropriately determine whether a shade is in an ultrasound image.

The learning device 10 executes learning using, as the first likelihood function, the second likelihood function, or both of them, a likelihood function in which values corresponding to pixel values of an image are variables and a maximum value is taken for a variable corresponding to a given pixel value that is none of a maximum pixel value and a minimum pixel value. For this reason, according to the embodiment, it is possible to inhibit generation of an image in which the pixel values concentrate in the minimum value or the maximum value.

The learning device 10 executes learning using, as the first likelihood function, the second likelihood function, or both of them, a likelihood function based on a probability density function of beta distributions for which parameters are set such that a maximum value is taken when a random variable corresponding to a pixel value of an image is a given value larger than 0 and smaller than 1. For this reason, according to the embodiment, it is possible to inhibit generation of an image in which the pixel values that are normalized within a range from 0 to 1 concentrate in 0 or 1.

The learning device 10 executes learning based on a reconstruction error between the input image and an output image obtained using a combining function to add the second image and subtract the first image. This inhibits the shade image and the subject image from being merely images obtained by simply halving the pixel values and accordingly a shade clearly appears in the shade image.

In the above-described embodiment, the input data to the encoder ad the output data from each of the decoders are image data; however, the input data and the output data may be not necessarily image data when the image data is restorable as images. For example, the learning device 10 may deal with an ultrasound image signal that is obtained from the probe as input data and output data. In that case, the learning device 10 is able to convert the data that is output as the ultrasound signal from the shade decoder into an image as requested.

In the image processing system 1, the probe 40 may have the same function as that of the recognition device 20. In that case, the probe 40 is able to determine whether there is a shade from the shade image that is output using the shade decoder from the ultrasound image and make a notification of the result of determination by an alert sound, or the like.

Changes may be made as desired in information containing the process procedure, the control procedure, the specific names, the various types of data and parameters illustrated or described herein and in the drawings unless otherwise specified. The specific examples, distribution, and numeric values described in the embodiment are examples only and they may be changed as desired.

Each component of each device illustrated in the drawings is a functional idea and need not necessarily be configured physically as illustrated in the drawings. In other words, specific modes of distribution and integration in each device are not limited to those illustrated in the drawings. In other words, all or part of the components can be configured by being distributed and integrated functionally or physically in a given unit according to various loads and usage. All or given part of various processing functions that are performed by each device may be enabled by a CPU and a program that is analyzed and executed by the CPU or may be enabled as hardware using a wired logic.

Figure 11:
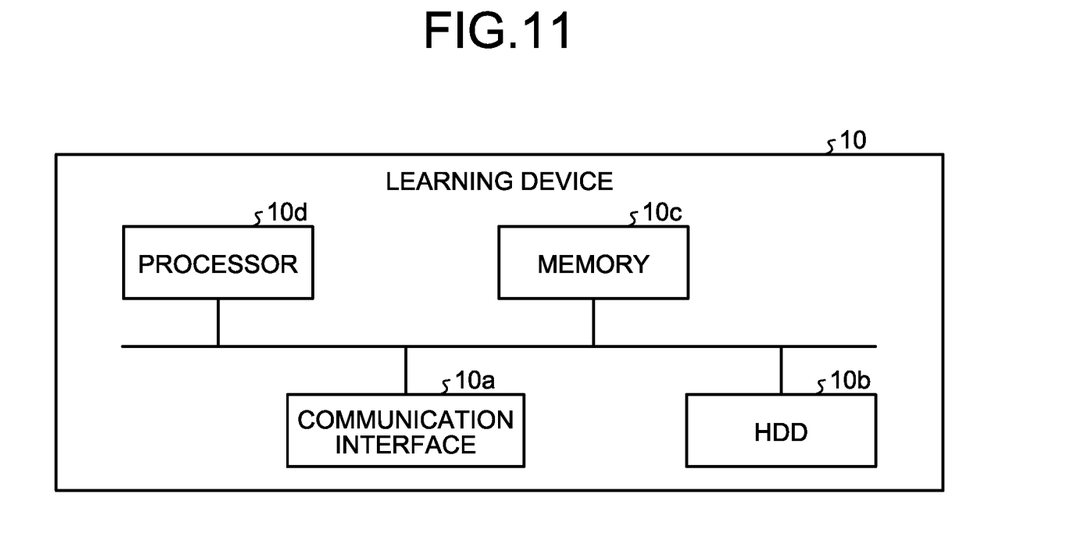
FIG. 11 is a diagram illustrating an exemplary hardware configuration.

FIG. 11 is a diagram illustrating an exemplary hardware configuration. As illustrated in FIG. 11, the learning device 10 includes a communication interface 10a, a hard disk drive (HDD) 10b, a memory 10c and a processor 10d. The units illustrated in FIG. 11 are connected to one another via a bus, etc.

The communication interface 10a is a network interface card, or the like, and communicates with other servers. The HDD 10b stores a program for running the functions illustrated in FIG. 1 and a DB.

The processor 10d reads the program for executing the same process as each of the processing units illustrated in FIG. 1 from the HDD 10b, or the like, and loads the program in the memory 10c, thereby running the process to execute each of the functions described using FIG. 1, etc. In other words, the process executes the same functions as the processing units of the learning device 10. Specifically, the processor 10d reads the program having the same functions as those of the input unit 131, the combining unit 132, and the learning unit 133 from the HDD 10b, or the like. The processor 10d then executes the process to execute the same process as those performed by the input unit 131, the combining unit 132, and the learning unit 133. The processor 10d is, for example, a hardware circuit, such as a CPU, a MPU, or an ASIC.

As described above, the learning device 10 reads the program and executes the program, thereby operating as the information processing device that executes a classifying method. In the learning device 10, a medium read device may read the program from a recording medium and executes the read program, thereby enabling the same functions as those of the above-described embodiment. The program in other embodiments are not limited to execution by the learning device 10. For example, the invention is applicable similarly to the case where another computer or server executes the program or the computer and the server cooperate to execute the program.

The program is distributable via a network, such as the Internet. The program may be stored in a computer-readable recording medium, such as a hard disk, a flexible disk (FD), a magneto-optical disk (MO), or a digital versatile disc (DVD) and may be read by a computer from the recording medium and thus executed.

According to an aspect, it is possible to appropriately determine whether a shade is in an ultrasound image.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein a learning program that causes a computer to execute a process comprising:
inputting an output from an encoder to which an input image is input to a first decoder and a second decoder; and executing learning of the encoder, the first decoder and the second decoder, based on a reconstruction error between the input image and an output image obtained by using a combining function for synthesizing a first image that is an output from the first decoder and a second image that is an output from the second decoder, based on a first likelihood function for the first image relating to shades in ultrasound images, and based on a second likelihood function for the second image relating to subjects in ultrasound images.

2. The non-transitory computer-readable recording medium according to claim 1, wherein the learning is executed by using, as at least one of the first likelihood function or the second likelihood function, a likelihood function in which values corresponding to pixel values of an image are variables and a maximum value is taken for a variable corresponding to a given pixel value that is none of a maximum pixel value and a minimum pixel value.

3. The non-transitory computer-readable recording medium according to claim 1, wherein the learning is executed by using, as at least one of the first likelihood function or the second likelihood function, a likelihood function based on a probability density function of beta distributions for which parameters are set such that a maximum value is taken when a random variable corresponding to a pixel value of an image is a given value larger than 0 and smaller than 1.

4. The non-transitory computer-readable recording medium according to claim 1, wherein the learning is executed based on another reconstruction error between the input image and another output image obtained by using another combining function for adding the second image and subtracting the first image.

5. A learning device comprising:
one or more memories; and
one or more processors coupled to the one or more memories and the one or more processors configured to:
input an output from an encoder to which an input image is input to a first decoder and a second decoder; and
execute learning of the encoder, the first decoder and the second decoder, based on a reconstruction error between the input image and an output image obtained by using a combining function for synthesizing a first image that is an output from the first decoder and a second image that is an output from the second decoder, based on a first likelihood function for the first image relating to shades in ultrasound images, and based on a second likelihood function for the second image relating to subjects in ultrasound images.

6. The learning device according to claim 5, wherein the learning is executed by using, as at least one of the first likelihood function or the second likelihood function, a likelihood function in which values corresponding to pixel values of an image are variables and a maximum value is taken for a variable corresponding to a given pixel value that is none of a maximum pixel value and a minimum pixel value.

7. The learning device according to claim 5, wherein the learning is executed by using, as at least one of the first likelihood function or the second likelihood function, a likelihood function based on a probability density function of beta distributions for which parameters are set such that a maximum value is taken when a random variable corresponding to a pixel value of an image is a given value larger than 0 and smaller than 1.

8. The learning device according to claim 5, wherein the learning is executed based on another reconstruction error between the input image and another output image obtained by using another combining function for adding the second image and subtracting the first image.

9. A computer-implemented learning method comprising:
inputting an output from an encoder to which an input image is input to a first decoder and a second decoder; and executing learning of the encoder, the first decoder and the second decoder, based on a reconstruction error between the input image and an output image obtained by using a combining function for synthesizing a first image that is an output from the first decoder and a second image that is an output from the second decoder, based on a first likelihood function for the first image relating to shades in ultrasound images, and based on a second likelihood function for the second image relating to subjects in ultrasound images, by a processor.

10. The computer-implemented learning method according to claim 9, wherein the learning is executed by using, as at least one of the first likelihood function or the second likelihood function, a likelihood function in which values corresponding to pixel values of an image are variables and a maximum value is taken for a variable corresponding to a given pixel value that is none of a maximum pixel value and a minimum pixel value.

11. The computer-implemented learning method according to claim 9, wherein the learning is executed by using, as at least one of the first likelihood function or the second likelihood function, a likelihood function based on a probability density function of beta distributions for which parameters are set such that a maximum value is taken when a random variable corresponding to a pixel value of an image is a given value larger than 0 and smaller than 1.

12. The computer-implemented learning method according to claim 9, wherein the learning is executed based on another reconstruction error between the input image and another output image obtained by using another combining function for adding the second image and subtracting the first image.

* * * * *